United States Patent

Inaoka et al.

[11] Patent Number: 5,688,843
[45] Date of Patent: Nov. 18, 1997

[54] OIL-ABSORBENT COMPOSITION, PARTICULATE OIL ABSORBER, OIL-ABSORBENT MATERIAL, AND OIL-ABSORBENT PACK

[75] Inventors: Toru Inaoka; Tomoki Gomi, both of Hyogo; Yoshiyuki Onda, Tokyo; Toshio Tamura, Kanagawa; Hideyuki Tahara, Osaka, all of Japan

[73] Assignee: Nippon Shokubai Co., Ltd., Osaka, Japan

[21] Appl. No.: 548,527

[22] Filed: Oct. 26, 1995

Related U.S. Application Data

[63] Continuation of Ser. No. 160,171, Dec. 2, 1993, abandoned.

[30] Foreign Application Priority Data

Mar. 17, 1993 [JP] Japan ............... 5-056920
Sep. 17, 1993 [JP] Japan ............... 5-231390

[51] Int. Cl.$^6$ ............... C08K 9/00
[52] U.S. Cl. ............... 523/216; 523/200; 523/212; 524/394; 524/396; 524/398; 524/399; 524/400; 524/430; 524/493
[58] Field of Search ............... 524/430, 493

[56] References Cited

U.S. PATENT DOCUMENTS

| | | | |
|---|---|---|---|
| 3,720,534 | 3/1973 | Macaulay et al. | 117/36.2 |
| 3,819,514 | 6/1974 | Clampitt et al. | 210/40 |
| 4,497,710 | 2/1985 | Wagu et al. | 210/635 |
| 4,812,319 | 3/1989 | Hsu et al. | 426/127 |
| 4,826,907 | 5/1989 | Murao et al. | 524/394 |
| 4,940,578 | 7/1990 | Yoshihara et al. | 424/70 |
| 4,977,192 | 12/1990 | Martineau et al. | 523/209 X |

FOREIGN PATENT DOCUMENTS

| | | |
|---|---|---|
| 0 441 512 A2 | 8/1991 | European Pat. Off. . |
| 0 441 512 A3 | 8/1991 | European Pat. Off. . |
| 0 455 143 A1 | 11/1991 | European Pat. Off. . |
| 2 153 358 | 5/1973 | France . |
| 2 513 895 | 4/1983 | France . |
| 45-27081 | 9/1970 | Japan . |
| 50-15882 | 2/1975 | Japan . |
| 50-59486 | 5/1975 | Japan . |
| 4-15286 | 1/1992 | Japan . |
| 4-41583 | 2/1992 | Japan . |
| 1191141 | 5/1970 | United Kingdom . |

*Primary Examiner*—Judy M. Reddick
*Attorney, Agent, or Firm*—Burns, Doane, Swecker & Mathis, LLP

[57] ABSTRACT

An oil-absorbent composition including 30 to 99.5 parts by weight of (I) an oil-absorbent, cross-linked polymer formed from 96–99.999% by weight of (A) monomer having a polymerizable unsaturated group in the molecule, said monomer (A) containing mainly a monomer having a solubility parameter of not more than 9, and 4–0.001% by weight of (B) a cross-linking monomer having at least two polymerizable unsaturated groups in the molecule, provided the sum of monomer (A) and cross-linking monomer (B) is 100%, and 70 to 0.5 to parts by weight of (IV) at least one compound selected from the group consisting of (II) inorganic compounds having a methanol value of not less than 25% and (III) substantially water insoluble organic acid salts, provided the sum of oil-absorbent, cross-linked polymer (I) and compound (IV) is 100 parts by weight.

14 Claims, No Drawings

OIL-ABSORBENT COMPOSITION, PARTICULATE OIL ABSORBER, OIL-ABSORBENT MATERIAL, AND OIL-ABSORBENT PACK

This application is a continuation of application Ser. No. 08/160,171, filed Dec. 2, 1993 now abandoned.

BACKGROUND OF THE INVENTION

1. Field of the Invention

The present invention relates to an oil-absorbent composition, a particulate oil absorber, an oil-absorbent material using the oil absorber, and an oil-absorbent pack using the oil absorber or the oil-absorbent material. More specifically, it relates to an oil-absorbent composition which selectively removes or recovers oil from the surface of a liquid of higher specific gravity such as water, excels in oil-maintaining properties, and improves oil-absorbing speed. It also concerns a particulate oil absorber, an oil-absorbing material using the oil absorber, and an oil-absorbent pack using the oil absorber or the oil-absorbent material.

2. Description of the Prior Art

In recent years, there has been the problem of cleaning up oil spills or oil slicks from the surface of water or sea water in view of environmental protection. The need for recovery of small volumes of waste oils, which are disposed of by homes and industries, and large volumes of leakage oils such as machine oil from industries, is also recognized.

Heretofore, there has been proposed an effective means of recovering leakage of oil or spilled oil from the surface with oil absorbers, and then calcining the oil absorber or the like. As the oil absorber, a synthetic fiber consisting of a hydrophobic fiber such as polypropylene fiber, polystyrene fiber, polyethylene fiber or a nonwoven was used. However, since such oil absorbers absorb and maintain oil in their interstices due to capillary action, they have the disadvantages that they fail to substantially maintain oil of low viscosity, they are liable to suffer sag due to easy re-bleeding of the absorbed oil under a slight external force, and that post treatment is very complicated due to the oil maintaining properties after absorption of oil.

Further, such oil absorbers absorb not only oil but also water if the oil portion in an oil-water mixture or thin oil film, which floats on the surface of water or sea water, is recovered. Therefore, conventional oil absorbers have the drawbacks that the efficiency of oil recovery is weak, the oil absorber is very difficult to recover after it has sunk in water or seawater, and the oil absorber so recovered is unsuitable for calcination.

In order to solve these problems, there have been proposed some oil absorbers made of a synthetic resin which absorbs oil in its structure causing it to swell. Examples thereof are a t-butylstyrene-divinylbenzene copolymer (Japanese Kokoku (Japanese patent publication) 45-27081), a t-butyl methacrylate and/or neopentyl methacrylate cross-linked polymer (Japanese Kokai (Japanese patent Laid-open) 50-15882), a mentyl methacrylate cross-linked polymer (Japanese Kokai 50-59486), a polynorbornene rubber (for example, NORSOREX AP, a product from CdF company), and a cross-linked polymer of an alkyl(meth)acrylate having 10 to 16 carbon atoms or the like (EP-A-0441512). These oil absorbers absorb oil in the molecules of the hydrophobic structure. They have the advantages that they selectively absorb the oil portion in an oil-water mixture or a thin oil film, which floats on the surface of water, and that they excel in the oil-maintaining properties of retained oil.

However, these oil absorbers of synthetic resin have the drawback of long absorbing time in comparison with that of synthetic fibers. In particular, they fail to absorb high viscosity oil within a short time.

Some methods have been proposed in order to improve the oil absorbing speed for high viscosity oil, e.g. milling the oil absorber to heighten the surface area. However, the expected oil absorption speed can not be fully achieved, since these milled oil absorbers are liable to aggregate in proportion to the degree of their particulation. On the other hand, in the absorption of low viscosity oil, the portions of the oil absorber which are present near the oil to be absorbed absorbs the oil within a short time and swell, thereby preventing the admission of oil to be absorbed into further gaps between the particles of oil absorber. This is the so called gel block phenomenon, i.e. the effective oil absorbing speed is reduced. Accordingly, the oil absorber is difficult to apply in a field where oil must be quickly absorbed or treated as in the case of oil spills or leakage accidents.

Other approaches to solve the above problems have been reported wherein an oil absorber is obtained by charging a particulate cross-linked polymer into a bag made of a hydrophobic porous cloth (Japanese Kokai 4-15286), or by depositing the specific cross-linked polymer on a hydrophobic porous material, whereby oil is temporarily absorbed by the material and then the absorbed oil is further absorbed by the deposited cross-linked polymer from the material (Japanese Kokai 4-41583). However, these cross-linked polymers require more time to absorb oil, and also require more contact time between the oil absorber and oil to be absorbed, in order to substantially improve oil maintaining properties. In particular, these oil absorbers have the drawbacks of low oil absorbing speeds for high viscosity oil.

In view of the above, it is not surprising that numerous efforts have been made to solve the problems of oil leakage.

An object of the present invention is therefore to provide an oil-absorbent composition which selectively removes or recovers oil.

Another object of the present invention is to provide a particulate oil absorber which selectively removes or recovers oil from the surface of a liquid of higher specific gravity such as water or even from an oil-water mixture, excels in oil-retaining properties, and improves oil-absorbing speed.

Yet another object of the present invention is to provide an oil-absorbent material having an improved oil recovery efficiency which selectively absorbs oil from an oil-water mixture or a thin oil film on water, and reduces re-bleed of the absorbed oil.

Yet further object of the present invention is to provide an oil-absorbent pack having excellent storing or handling properties.

NOMENCLATURE

The solubility parameter (or SP value) serves as a scale for indicating the polarity of compounds. In the present specification, the values are calculated by substituting Hoy's cohesive energy constant in Small's formula in units of $(cal/cm^3)^{1/2}$.

The methanol value (or M value) serves as a scale for indicating the hydrophobic degree of inorganic compounds. This value is represented as a methanol vol % when an aqueous methanol solution is added and a hydrophobic compound starts to wet. The value is calculated as follows. A powder of the hydrophobic compound and an aqueous methanol solution having a prescribed methanol concentration are combined in a flask, and then the flask is shaken twice. The wetting of the powder is then measured. For instance, a compound having a M value of 30% means that the compound wets in an aqueous methanol solution having a methanol concentration of 30% by volume or more, but does not wet in an aqueous methanol solution having a methanol concentration of less than 30% by volume.

SUMMARY OF THE INVENTION

According to the first aspect of the present invention, there is provided an oil-absorbent composition comprising 30 to 99.5% by weight of (I) an oil-absorbent cross-linked polymer formed from 96–99.999% by weight of (A) a monomer having a polymerizable unsaturated group in the molecule, said monomer (A) containing mainly a monomer having a solubility parameter (SP value) of not more than 9, and 0.001–4% by weight of (B) a cross-linking monomer having at least two polymerizable unsaturated groups in the molecule, provided the sum of monomer (A) and monomer (B) is 100%, and 0.5 to 70% by weight of (IV) at least one compound selected from the group consisting of (II) inorganic compounds having a methanol value (methanol volume based on an aqueous methanol solution when a sample is added and starts to wet.) of not less than 25% and (III) substantially water-insoluble organic acid salts, provided the sum of oil-absorbent, cross-linked polymer (I) and compound (IV) is 100 parts by weight.

According to the second aspect of the present invention, there is provided a particulate oil absorber having an average particle diameter of 0.01 to 20 mm and formed from the aforementioned oil-absorbent composition.

According to the third aspect of the present invention, there is provided an oil-absorbent material comprising the aforementioned oil-absorbent composition or the aforementioned particulate oil absorber, and a porous substrate on which the composition or the particulate oil absorber has been deposited.

According to the fourth aspect of the present invention, there is provided an oil-absorbent pack comprising the aforementioned particulate oil absorber or the aforementioned oil-absorbent material, and a vessel whereof at least part is constructed of an oil-permeable material in which the particulate oil absorber or the oil-absorbent material has been filled.

DETAILED DESCRIPTION OF THE PREFERRED EMBODIMENTS

A main feature of the present invention resides in a combination of a specific oil-absorbent, cross-linked polymer and a specific compound.

According to the first aspect of the present invention, there is provided an oil-absorbent composition.

The monomer (A) employed in preparing the oil-absorbent, cross-linked polymer (I) used in the present invention has a polymerizable unsaturated group in the molecule and comprises mainly a monomer having a SP value of not more than 9. If a monomer having a SP value of more than 9 is mainly used as the monomer (A), the resultant cross-linked polymer fails to fully absorb oil. Therefore, such a monomer is not preferred.

Examples of monomers having the SP value of not more than 9 and a polymerizable unsaturated group in the molecule are unsaturated carboxylic acid esters such as methyl (meth)acrylate, ethyl (meth)acrylate, propyl (meth)acrylate, butyl (meth)acrylate, isobutyl (meth)acrylate, t-butyl (meth) acrylate, 2-ethylhexyl (meth)acrylate, n-octyl (meth) acrylate, dodecyl (meth)acrylate, stearyl (meth)acrylate, phenyl (meth)acrylate, octylphenyl (meth)acrylate, nonylphenyl (meth)acrylate, dinonyl (meth)acrylate, cyclohexyl (meth)acrylate, mentyl (meth)acrylate, isobornyl (meth) acrylate, dibutylmaleate, dodecylmaleate, dodecylcrotonate, and didodecylitaconate; (meth)acrylamides having a hydrocarbon group such as (di)butyl (meth)acrylamide, (di) dodecyl (meth)acrylamide, (di)stearyl (meth)acrylamide, (di)butylphenyl (meth)acrylamide, and (di)octylphenyl (meth)acrylamide; alpha-olefins such as 1-hexene, 1-octene, isooctene, 1-nonene, and 1-decene; alicyclic vinyl compounds such as vinyl cyclohexane; hydrocarbon group-containing allylethers such as dodecyl allylether; hydrocarbon group-containing vinyl esters such as vinyl capronate, vinyl laurate, vinyl palmitate, and vinyl stearate; hydrocarbon group-containing vinyl ethers such as butyl vinyl ether, and dodecyl vinyl ether; and aromatic vinyl compounds such as styrene, t-butyl styrene, and octyl styrene or the like. Of these, one or more members may be used.

The preferred monomer (A) is a monomer mixture mainly containing at least one (a) unsaturated compound selected from the group consisting of an alkyl (meth)acrylate, an alkylaryl (meth)acrylate, an alkyl (meth)acrylamide, an alkyl aryl (meth)acrylamide, a fatty acid vinyl ester, an alkyl styrene, and an alpha-olefin wherein the unsaturated compound (a) has a fatty hydrocarbon group having 3–30 carbon atoms, in view of oil-absorbing efficiency and oil-maintaining properties. The amount of monomer having the SP value of not more than 9 and a polymerizable unsaturated group in the molecule is usually not less than 50% by weight and preferably 70% by weight, based on the total weight of the monomer (A). If the amount is not more than 50% by weight, the resultant cross-linked polymer fails to fully absorb or maintain oil.

Accordingly, the monomer is preferred to contain not less than 50% by weight, based on the weight of the monomer (A), of a monomer having the SP value of not more than 9 and a polymerizable unsaturated group in the molecule. Further, the monomer may contain not more than 50% by weight of a monomer having the SP value of more than 9 and a polymerizable unsaturated group in the molecule. Examples of the latter monomers comprise (meth)acrylic acid, acrylonitrile, maleic anhydride, fumaric anhydride, hydroxyethyl (meth)acrylate, polyethylene glycol (meth) acrylate, methoxy polyethylene glycol (meth)acrylate, or the like.

The cross-linking monomer (B) employed in preparing the oil-absorbent, cross-linked polymer (I) used in the present invention has at least two polymerizable unsaturated groups in the molecule.

Examples of the cross-linking monomer (B) are ethylene glycol di(meth)acrylate, diethylene glycol di(meth)acrylate, polyethylene glycol di(meth)acrylate, polyethylene glycol-polypropylene glycol di(meth)acrylate, propylene glycol di(meth)acrylate, polypropylene glycol di(meth)acrylate, 1,3-butylene glycol di(meth)acrylate, neopentyl glycol di(meth)acrylate, 1,6-hexanediol di(meth)acrylate, N,N'-methylenebisacrylamide, N,N'-propylenebisacrylamide, glycerin tri(meth)acrylamide, trimethylene propane tri (meth)acrylate, tetramethylol methane tetra(meth)acrylate, a polyfunctional (meth)acrylate produced by esterification of an alkylene oxide adduct of a multivalent alcohol (for instance, glycerin, trimethylolpropane or tetramethylol ethane) with (meth)acrylate and divinylbenzene, or the like. Of these, one or more members may be used.

The amount of monomer (A) is in the range of 96–99.999% by weight and that of cross-linking monomer (B) in the range of 0.001–4% by weight, based on the sum of monomer (A) and cross-linking monomer (B). If the amount of monomer (A) is not more than 96% by weight and that of cross-linking monomer (B) exceeds 4% by weight, then the resultant cross-linked polymer has too high cross-linked density and therefore fails to absorb much oil. Conversely, if the amount of monomer (A) exceeds 99.999% by weight and that of cross-linking monomer (B) is not more than 0.001% by weight, then the cross-linked polymer has increased solubility in oil and after absorption is liable to fluidize, thereby failing to have ability as an oil absorber.

The cross-linked polymer (I) of the present invention may be produced by suspension polymerization. The suspension polymerization is conducted by dispersing the aforementioned monomer components in an aqueous medium in the presence of a protective colloid such as polyvinyl alcohol, hydroxyethyl cellulose or gelatin, and a surfactant such as a sodium alkyl sulphonate, a sodium alkylbenzene sulphonate, polyethylene alkylether or fatty acid soap, polymerizing the resultant dispersion using an oily radical polymerization initiator. If necessary, the monomer components may be dissolved in a water insoluble organic solvent, and then the resultant monomer solution subjected to such a suspension polymerization. As the oily radical polymerization initiator, examples are organic peroxides such as benzoilperoxide, lauroylperoxide, or cumene hydroperoxide; and azocompounds such as 2,2'-azobisisobutyronitrile or 2,2'-azobisidimethyl valeronitrile. The amount of initiator to be used is generally 0.1–5% by weight, based on the total weight of monomer components. The polymerization is usually conducted in the range of 0°–150° C. depending on the kind of monomer components used and the kind of polymerization initiator used.

An alternative for producing the cross-linked polymer (I) of the present invention is conducted by bulk polymerization, then crushing or milling the resultant polymer. The bulk polymerization may be conducted by pouring the monomer components and a polymerization initiator in a mold, followed by polymerization at 50°–150° C.

The cross-linked polymer (I) of the present invention is preferred to consist of particles having an average particle diameter in the range of 0.5 to 500 μm, preferably 2 to 350 μm, by adopting a pre-suspension step using a homomixer prior to suspension polymerization, or adjusting the stirring force during suspension polymerization. If the average particle diameter is not more than 0.5 μm, the surface area of particles decreases on contact with oil due to the occurrence of partial aggregation of the particles, thereby making it difficult to provide an oil absorber with increased oil absorbing speed. Conversely, if the average particle diameter exceeds 500 μm, the oil absorbing speed decreases in proportion to the reduction in the surface of the cross-linked polymer.

The compound (IV) employed in preparing the oil-absorbent composition of the present invention is at least one member selected from the group consisting of (II) inorganic compounds having a methanol value of not less than 25% and (III) substantially water-insoluble organic acid salts.

Examples of preferred inorganic compounds (II) are those formed by hydrophobic treatment of inorganic compounds such as zinc oxide, alumina (aluminum oxide), aluminum silicate, silica (silicon dioxide), calcium oxide, titanium dioxide, barium titanate, iron oxide, barium sulfate, barium carbonate, barium oxide, manganese dioxide, manganese carbonate, magnesium carbonate or magnesium oxide. The hydrophobic treatment is effected by providing chemically or physically inactive properties to the surface of the inorganic compound, in particular a powder thereof, using a silane coupling agent such as alkylalkoxy silane or an alkyl halogenated silane; a polysiloxane such as dimethyl siloxane; synthesized or natural wax; or calcium or the like. Of these, one or more members may be used. In particular, hydrophobically-treated silica or alumina is the most preferred in view of their availability as granular powders in several kinds of particle size and improvement in oil-absorbing speed.

The substantially water insoluble organic acid salt (III) is a salt whereof less than one gram of an organic acid salt dissolves in 100 grams of water at 20° C. Examples of this substantially water insoluble organic salt (III) are metallic salts of organic acids such as straight-chain saturated fatty acids, e.g. butyric acid, caproic acid, caprylic acid, pelargonic acid, capric acid, undecanoic acid, lauric acid, myristic acid, palmitic acid, stearic acid, arachic acid, behenic acid, lignoceric acid, cerotic acid, montanic acid or melissic acid; straight-chain unsaturated fatty acids, e.g. oleic acid or linoleic acid; branched fatty acids, e.g. isostearic acid; hydroxyl group-containing fatty acids, e.g. ricinoleic acid or 12-hydroxyl stearic acid; benzoic acid; naphthenic acid; rosin acids, e.g. abietic acid ordextropimaric acid; or the like. Of these, a fatty acid of 6–30 carbon atoms is preferred.

Metals employed in preparing the substantially water insoluble organic acid salt (III) are those which are water insoluble or slightly soluble in water when the corresponding metal salt is formed. Examples of such metals are sodium, potassium, lithium, copper, magnesium, calcium, strontium, barium, zinc, cadmium, aluminum cerium, titanium, zirconium, lead, chromium, manganese, cobalt, and nickel or the like. Of these, one or more members may be used.

In view of the improvement in oil-absorbing speed, a multivalent metal salt of a fatty acid of 6–30 carbon atoms is preferred as the substantially water soluble organic acid salt (III). The multivalent metal salt contains a neutral soap (perfectly neutral type), an acidic soap (organic acid rich type), a basic soap (metal rich type), or a mono-, di-, or tri-soap.

The compound (IV) used in the present invention is preferably a powder having an average particle diameter of 0.01–300 μm, preferably 0.05–100 μm. If the average particle diameter is less than 0.01 μm, the particles are liable to aggregate, thereby causing the oil-absorbing speed to decrease. Conversely, if the average particle diameter exceeds 300 μm, it is difficult for the particles to provide synergistic effects with the cross-linked polymer (I), and the oil-absorbing speed does not improve.

The ratio of the oil-absorbent, cross-linked polymer (I) to the compound (IV) employed in preparing the oil-absorbent composition of the present invention is 30 to 99.5:70 to 0.5 weight parts, preferably 50 to 95:50 to 5 weight parts. If the ratio of compound (IV) is less than 0.5 weight part, the oil-absorbent, cross-linked polymer (I) in the oil-absorbent composition aggregates, thereby causing the oil-absorbing speed to decrease. Conversely, if the ratio of compound (IV) exceeds 70 weight parts, the resultant oil-absorbent composition has only poor oil-absorbent capacity and oil-maintaining ability.

The oil-absorbent composition of the present invention is usually used in the form of particles which are obtained by mixing the oil-absorbent, cross-linked polymer (I) with the compound (IV), or a mixture of the oil-absorbent, cross-linked polymer (I) and the compound (IV) is filled in an oil-permeable vessel.

The oil-absorbent composition is usually obtained by wet mixing or dry mixing the oil-absorbent, cross-linked polymer (I) with the compound (IV). The wet mixing is effected by, for instance, mixing and dispersing the oil-absorbent, cross-linked polymer (I) with the compound (IV) in an aqueous medium, if necessary in the presence of a surfactant, and then filtering and drying it. The dry mixing is effected by, for instance, mixing the oil-absorbent, cross-linked polymer (I) with the compound (IV) using a colloidal mill or a mixer. Further, a method may be adopted wherein the cross-linked polymer (I) produced by bulk polymerization and the compound (IV) are mixed together while adjusting the particle size by means of a grinding process. Of these, wet mixing is preferred for the reasons that an aqueous dispersion of the oil-absorbent, cross-linked polymer (I) produced by suspension polymerization as such can be mixed with the compound (IV).

The oil-absorbent composition of the present invention may contain other components in such a level as not to impair the oil-absorbent ability. The other components comprise hydrophilic inorganic compounds having a methanol value of not more than 25% such as silica, alumina, calcium carbonate, talc and diatomaceous earth; metals such as iron and aluminum; resins such as polystyrene, polyethylene or vinylacetate; organic compounds such as wax; and fibers such as cotton and pulp, or the like.

Further, the oil-absorbent composition may be used in combination with a conventional oil-absorbent agent or filler such as rice hull, straw, pulp, cotton, porous lime, porous silica, porous perlite, polypropylene fiber, foamed polyurethane or the like.

According to the second aspect of the present invention, there is provided a particulate oil absorber.

The particulate oil absorber generally has an average particle diameter of 0.01 to 20 mm, preferably 0.2 to 5 mm. The particulate oil absorber is obtained by, for instance, mixing or dispersing the particles of the oil-absorbent, cross-linked polymer (I) with the particles of the compound (IV) in an aqueous medium, allowing the particles to aggregate, coagulate or granulate, and then separating the aggregate, coagulate or granulate from the aqueous solution. Other methods for producing a particulate oil absorber are mixing the starting materials while granulating them by hetero-aggregation or hydrophobic interaction; by mixing the starting materials in the water dispersion state, decreasing the water content to a level at which the starting materials can be granulated using the remaining water as a granulating agent, granulating them, and drying them; by granulating the starting materials using a granulating agent such as a self-adhesive or adhesive, e.g. a water-soluble compound of starch and polyvinyl alcohol or the like; by adding a flocculating agent to the water dispersions, filtering and drying the resultant flocculates to form; or by drying the water dispersions using a spray dryer or the like. If the average particle diameter is less than 0.01 mm, the resultant particulate oil absorber has inferior handling properties due to the occurrence of dust which is liable to generate partial aggregation, thereby causing the oil absorbing speed to decrease. Conversely, if the average particle diameter exceeds 20 mm, the resultant particulate oil absorber has inferior oil absorbing speed and also inferior handling properties if the particulate oil absorber is deposited on a porous support.

The particulate oil absorber can be applied in several kind of forms, i.e. the particulate oil absorber may be added to or sprinkled on oil or an oil-water mixture in which the oil is in water suspension or is slightly dissolved in an aqueous solution, or it may be filled in a conical tube, and then added thereto.

According to the third aspect of the present invention, there is provided an oil-absorbent material comprising the aforementioned oil-absorbent composition or the aforementioned particulate oil absorber, and a porous substrate on which the oil-absorbent composition or the particulate oil absorber has been deposited.

The oil-absorbent material of the present invention is usually obtained according to known methods, e.g. by wet- or dry-mixing a particulate oil absorber with a fibrous material capable of forming the porous substrate and then forming it, or by depositing a particulate oil absorber on a porous substrate which has been formed.

The former method is effected as follows. The fibrous material employed in forming the porous substrate may consist of, but is not limited to, a material which can be formable the porous substrate such as a nonwoven cloth which has a large surface area capable of effectively depositing a particulate oil absorber thereon or in its pores and has interstices capable of adsorbing and maintaining oil. Examples of the fibrous material are a fibrous fleece or adhering fiber made of polyolefin such as polypropylene and polyethylene, polyethylene, nylon, polyurethane, cellulose, viscose, regenerated cellulose (rayon), cupra ammonium rayon, acetate, pulp, cotton, glass, and metal, or the like. An adhering agent or a binder may be used in forming the porous substrate from the fibrous material in order to increase the strength of the resultant porous substrate.

As for the former method, known methods for producing nonwoven cloth, include the Rand Web method, the Karl Krioyer method, the dry air lay pulp method such as the Honshu method, the wet method, the spanless method, the meltblow method, the spanbond method, and the flush spinning method.

In the dry method for producing a nonwoven cloth, a particulate oil absorber and a fibrous fleece or adhesive fiber, and an adhesive when necessary, are mixed together or laminated, and formed into a sheet by the needle punch method, the spanbond method, the water jet method or the heat treatment method, thereby dispersing and fixing the particulate oil absorber in the nonwoven cloth.

Alternatively, in the wet method for producing a nonwoven cloth, a particulate oil absorber, a fibrous fleece or adhesive fiber and an adhesive are poured in water, mixed together, and formed into a sheet by drying or heat treatment, thereby dispersing and fixing the particulate oil absorber in the nonwoven cloth. In the wet method, the cross-linked polymer (I) and the compound (IV) can be used instead of the particulate oil absorber. When the cross-linked polymer (I) and the compound (IV) are used, the formation of a particulate oil absorber and the formation of a sheet are simultaneously effected.

The latter method is carried out as follows. The porous substrate which has been formed and employed in depositing the particulate oil absorber may consist of, but is not limited to, a substrate having a large surface area capable of effectively depositing the particulate oil absorber and interstices capable of adsorbing and maintaining oil. Examples of porous substrates are nonwoven cloths, sponges, papers and sinters which are made of polyolefins such as polypropylene and polyethylene, polyester, nylon, polyurethane, cellulose, viscose, rayon, cupra ammonium rayon, acetate, pulp, cotton, glass, metal or the like.

As for the latter method, known methods include fixing a particulate oil absorber on a porous substrate with a self-adhesive or adhesive; depositing a particulate oil absorber on a porous substrate by sprinkling the particulate oil absorber on the porous substrate, then uniformly dispersing the particulate oil absorber therein by vibration when necessary, and heat-treating the dispersed porous substrate; and fixing a particulate oil absorber with a porous substrate by sprinkling an aqueous dispersion of the particulate oil absorber on the porous substrate, then uniformly dispersing the particulate oil absorber therein by vibration when necessary and drying the dispersed porous substrate.

The amount of particulate oil absorber employed in depositing on the porous substrate is preferably 10 to 20000 parts by weight based on 100 parts by weight of the porous substrate. If the amount is less than 10 parts by weight, the resultant oil-absorbent material fails to fully absorb or maintain oil. Conversely, if the amount exceeds 20000 parts by weight, the resultant oil-absorbent material is liable to lose oil-absorbing ability, since the particulate oil absorber fills almost all of the interstices of the porous substrate.

An oil permeable sheet such as paper or cloth, or an oil impermeable sheet such as plastic film or metal foil may be affixed to the front or rear side of the oil-absorbent material, in order to improve its adhesive strength or printing properties.

According to the fourth aspect of the present invention there is provided an oil-absorbent pack comprising the aforementioned particulate oil absorber or the aforementioned oil-absorbent material, and a vessel whereof at least part is made of oil-permeable material in which the particulate oil absorber or the oil-absorbent material has been filled.

The vessel employed in preparing the oil-absorbent pack of the present invention may consist of, but is not limited to, a bag made of cloth or paper; a porous package; or a basket made of net. At least part of the vessel is made of oil-permeable material, in particular hydrophobic porous material. The porous material is one that does not dissolve or swell in water or sea water, and has many holes through which the particulate oil absorber or the oil-absorbent material enclosed does not pass and the oil to be adsorbed or absorbed readily passes. Examples of porous materials are a cloth or paper made of synthetic fiber or natural fiber such as pulp, and a net of stainless mesh. Of these, it is preferable to select at least one nonwoven cloth or woven cloth selected from the group consisting of a polyolefin such as polypropylene and polyethylene; polyester; nylon; and polyurethane, which have high hydrophobicity, preferably high lipophilic nature, in order to provide an oil absorber having superior oil absorbing ability.

The oil-absorbent pack of the present invention can be applied in any form such as a cylinder, rectangle, sphere, or the sausage shape or the like depending on the usage.

In addition, the oil-absorbent pack may contain a conventional oil-absorbent agent or filler such as rice hull, straw, pulp, cotton, porous lime, porous silica, porous perlite, polypropylene fiber, foamed polyurethane or the like.

An oil permeable sheet such as paper or cloth, or an oil impermeable sheet such as plastic film or metal foil may be affixed to the front or rear side of the oil-absorbent pack in order to improve its adhesive strength or printing properties.

The oil-absorbent composition of the present invention can selectively absorb oil even from an oil water mixture and maintain the absorbed oil, because of a synergistic effect due to a combination of the oil-absorbent, cross-linked polymer (I) with the compound (IV). Further, the oil-absorbent composition has a higher oil-absorbent speed for a variety of oils since the wettability of the oil-absorbent composition for viscous oil is improved, and gel blocking, which occurs when the oil-absorbent composition absorbs a low viscosity oil and the oil-absorbent composition in vicinity of the oil surface prevents further impregnation of oil thereinto because of swelling, is effectively prevented. Accordingly, the oil-absorbent composition can be used in many applications such as recovery of oil from sea water, recovery of oil which floats on water or sea water or recovery of oil from waste water, or for emulsion breakers, agents for treating waste oil, agents for treating waste edible oil, agents for treating waste machine oil, agents for domestic or industrial cleaning, chemical dustcloths, oil sensors for leak oil, oil seal agents, oil-maintaining agents as well as gradual-release agents for releasing aromatics or insecticides, and agents for fishing or the like.

The particulate oil absorber of the present invention is superior in storage or handling properties due to its specific particle diameter by forming, and has excellent oil-absorbent properties such as oil capacity and oil-absorbing speed.

The oil-absorbent material of the present invention has superior oil-maintaining properties even for a short contact time with the oil to be treated, thereby preventing sag of the retained oil and permitting easy post treatment of the absorbed oil, since the oil which has been adsorbed in the porous substrate can be promptly absorbed by the particulate oil absorber deposited on the porous substrate. Further, the oil-absorbent material can be readily attached to the columns of an oil water treating apparatus or a ventilator such as an oil mist filter. This is because the interstices of the porous substrate serve for ensuring breathability and liquid fluidity.

The oil-absorbent pack of the present invention selectively absorbs oil even from an oil water mixture, and has excellent oil-maintaining properties and oil-absorbent speed since the particulate oil absorber or the oil-absorbent material is packed in an oil permeable material. Further, the oil-absorbent pack has the advantages of readily handling or storage since the particles which present the handling problems can be packed in the vessel.

EXAMPLES

The present invention is explained in more detail with reference to the following examples, but the aspect of the present invention is not defined by those examples. Unless otherwise indicated all parts and percentages are by weight.

I. Particulate oil absorber a. Hydrophobic inorganic compound series

Example 1

Three (3) parts of a polyoxyethylene alkylether (sold under the trade name of "SOFTANOL 150" by Nippon Shokubai Co., Ltd in Japan) dissolved in 300 parts of water was placed in a 500 ml flask equipped with a thermometer, a stirrer, a gas introducing tube and a reflux condenser. With stirring, nitrogen gas was introduced into the flask to replace the air, and then the contents of the flask were heated to 40° C. in a current of nitrogen gas. A solution of 59.762 parts of isobutyl methacrylate (SP value: 7.5) and 39.842 parts of stearyl acrylate (SP value: 7.9) as the monomer (A), 0.396 parts of 1,6-hexanediol diacrylate as the cross-linking monomer (B), and 0.5 parts of benzoilperoxide was added in the flask, and stirring vigorously continued at 750 rpm.

The inner temperature of the flask was then heated to 80° C., and maintained at the same temperature for two hours to carry out polymerization. The inner temperature was further heated to 90° C., and this temperature maintained for two hours to complete polymerization. As a result, a water dispersion (having a resinous component of 25% by weight) containing an oil-absorbent, cross-linked polymer (1) having an average particle diameter of 30 μm was produced.

Separately, 5 parts of a hydrophobic silica fine powder (sold under the trade name of "Nipsil SS-70" by Nihon Silica K. K. in Japan, M value: 65, average particle diameter: 4 μm) was added to an aqueous solution in which 1.5 parts of a polyoxyethylene alkylether (supra) had been dissolved in 150 parts of water, and the resultant mixture was stirred at 300 rpm to produce a water dispersion of the hydrophobic silica. To the water dispersion obtained, 80 parts of the previous water dispersion containing the oil-absorbent, cross-linked polymer (1) was gradually added, and stirring continued for ten minutes to give rise to an aggregate composed of the oil-absorbent, cross-linked polymer (1) and the hydrophobic silica. By filtering the aggregate and drying it at 80° C., a particulate oil absorber (1) of 20 parts of the oil-absorbent, cross-linked polymer (1) and 5 parts of the hydrophobic silica was produced. The particulate oil absorber (1) had an average particle diameter of 2 mm.

Example 2

The procedure of Example 1 was repeated, except that 49.930 parts of hexadecyl methacrylate (SP value: 7.8) and 49.930 parts of N-octyl methacrylamide (SP value: 8.6) as the monomer (A), 0.140 part of divinylbenzene as the cross-linking monomer (B) were used instead, and the revolution was changed to 300 rpm. As a result, a water dispersion (having a resinous component of 25% by weight) containing an oil-absorbent, cross-linked polymer (2) having an average particle diameter of 100 μm was produced.

Separately, 5 parts of a hydrophobic silica fine powder (supra) was added in an aqueous solution in which 1.5 parts of a polyoxyethylene alkylether (supra) had been dissolved in 150 parts of water, and the resultant mixture was stirred at 300 rpm to produce a water dispersion of the hydrophobic silica. To the water dispersion obtained, 180 parts of the previous water dispersion containing oil-absorbent, cross-linked polymer (2) was gradually added, and stirring continued for ten minutes to give rise to an aggregate composed of the oil-absorbent, cross-linked polymer (2) and the hydrophobic silica. By filtering the aggregate and drying it at 80° C., a particulate oil absorber (2) of 45 parts of oil-absorbent, cross-linked polymer (2) and 5 parts of the hydrophobic silica was produced. The particulate oil absorber (2) had an average particle diameter of 3 mm.

Example 3

A solution containing 57.772 parts of dodecyl acrylate (SP value: 7.9) and 38.515 parts of N-dioctyl acrylamide (SP value: 8.2) as the monomer (A), 3.713 parts of polypropylene glycol dimethacrylate (molecular weight: 4000) as the cross-linking monomer (B), and 0.5 parts of 2,2'-azobisisobutyronitrile as the polymerization initiator was added in an aqueous solution in which 3 parts of a polyoxyethylene alkylether (supra) had been dissolved in 300 parts of water. The mixed solution was stirred at 10000 rpm for ten minutes to produce a water dispersion of the monomer.

The water dispersion thus obtained was placed in a 500 ml flask equipped with a thermometer, a stirrer, a gas introducing tube, and a reflux condenser. Nitrogen gas was introduced in the flask to replace the air while stirring vigorously continued at 400 rpm. Under a current of nitrogen gas, the inner temperature of flask was heated to 70° C., the temperature maintained for two hours to polymerize, and further heated to 90° C. so as to complete polymerization. As a result, a water dispersion (having a resinous component of 25% by weight) containing an oil-absorbent, cross-linked polymer (3) having an average particle diameter of 5 μm was produced.

Separately, 5 parts of a hydrophobic silica fine powder (supra) was added in an aqueous solution in which 1.5 parts of a polyoxyethylene alkylether (supra) had been dissolved in 150 parts of water, and the resultant mixture was stirred at 300 rpm to give rise to a water dispersion of the hydrophobic silica. To the water dispersion obtained, 30 parts of the previous water dispersion containing the oil-absorbent, cross-linked polymer (3) was gradually added, and stirring continued for ten minutes to give rise to an aggregate composed of the oil-absorbent, cross-linked polymer (3) and the hydrophobic silica. By filtering the aggregate and drying it at 80° C., a particulate oil absorber (3) of 7.5 parts of oil-absorbent, cross-linked polymer (3) and 5 parts of the hydrophobic silica was produced. The particulate oil absorber (3) had an average particle diameter of 0.5 mm.

Example 4

The procedure of Example 1 was repeated, except that 99.823 parts of dodecyl acrylate (SP value: 7.9) as the monomer (A) and 0.177 parts of ethylene glycol diacrylate as the cross-linking monomer (B) were used instead. As a result, a water dispersion (having a resinous component of 25% by weight) containing an oil-absorbent, cross-linked polymer (4) having an average particle diameter of 30 μm was produced.

Separately, 5 parts of a hydrophobic silica fine powder (supra) was added in an aqueous solution in which 1.5 parts of a polyoxyethylene alkylether (supra) had been dissolved in 150 parts of water, and the resultant mixture was stirred at 300 rpm to produce a water dispersion of the hydrophobic silica. To the water dispersion obtained, 80 parts of the previous water dispersion containing the oil-absorbent, cross-linked polymer (4) was gradually added, and stirring continued for ten minutes to give rise to an aggregate composed of the oil-absorbent, cross-linked polymer (4) and the hydrophobic silica. By filtering the aggregate and drying it at 80° C., a particulate oil absorber (4) of 20 parts of the oil-absorbent, cross-linked polymer (4) and 5 parts of the hydrophobic silica was produced. The particulate absorber (4) had an average particle diameter of 2 mm.

Example 5

The procedure of Example 1 was repeated, except that 54.881 parts of t-butyl styrene (SP value: 7.9) and 44.903 parts of 1-decene (SP value: 7.0) as the monomer (A), and 0.216 parts of divinylbenzene as the cross-linking monomer (B) were used instead. As a result, a water dispersion (having a resinous component of 25% by weight) containing an oil-absorbent, cross-linked polymer (5) was produced. By filtering the resinous component from the water dispersion, drying it, and then grounding it using a colloidal mill, a particulate, oil-absorbent, cross-linked polymer (5) having an average particle diameter of 5 μm was produced.

15 parts of the resultant particulate, oil-absorbent, cross-linked polymer (5) and 5 parts of a hydrophobic silica fine powder (sold under the trade name of "Nipsil SS-75" by Nihon Silica K. K. in Japan, M value: 30, average particle diameter: 4 μm) were mixed and granulated by a colloidal mill. As a result, a particulate oil absorber (5) having an average particle diameter of 1 mm was produced.

Example 6

The procedure of Example 1 was repeated, except that 74.793 parts of nonylphenyl acrylate (SP value: 8.3) and 24.931 parts of hydroxyethyl acrylate (SP value: 10.3) as the monomer (A) were used instead, and the amount of 1,6-hexanediol diacrylate was changed to 0.276 parts. As a result, a water dispersion (having a resinous component of 25% by weight) containing an oil-absorbent, cross-linked polymer (6) having an average particle diameter of 30 μm was produced.

Separately, 5 parts of a hydrophobic alumina fine powder (sold under the trade name "RFY-C" by Nihon Aerogil in Japan, M value: 50, average particle diameter: 3 μm) was added in an aqueous solution in which 1.5 parts of a polyoxyethylene alkylether (supra) had been dissolved in 150 parts of water, and the resultant mixture was stirred at 300 rpm to produce a water dispersion of the hydrophobic alumina. To the water dispersion obtained, 60 parts of the previous water dispersion containing the oil-absorbent, cross-linked polymer (6) was gradually added, and stirring continued for ten minutes to give rise to an aggregate composed of the oil-absorbent, cross-linked polymer (6) and the hydrophobic alumina. By filtering the aggregate and drying it at 80° C., a particulate oil absorber (6) of 15 parts of oil-absorbent, cross-linked polymer (6) and 5 parts of the hydrophobic alumina was produced. The particulate oil absorber (6) had an average particle diameter of 2 mm.

Example 7

The procedure of Example 1 was repeated, except that 99.811 parts of vinyl laurate (SP value: 7.9) as the monomer (A) and 0.187 parts of trimethylol propane triacrylate were used instead. As a result, a water dispersion (having a resinous component of 25% by weight) containing an oil-absorbent, cross-linked polymer (7) having an average particle diameter of 30 μm was produced.

Separately, 1 part of a hydrophobic silica fine powder (supra) and 4 parts of aluminum stearate fine powder (average particle diameter: 5 μm) were added in an aqueous solution in which 1.5 parts of a polyoxyethylene alkylether (supra) had been dissolved in 150 parts of water, and the resultant mixture was stirred at 300 rpm to give rise to a water dispersion of the hydrophobic silica and the aluminum stearate. To the water dispersion obtained, 60 parts of the previous water dispersion containing the oil-absorbent, cross-linked polymer (7) was gradually added, and stirring continued for ten minutes to give rise to an aggregate composed of the oil-absorbent, cross-linked polymer (7) and the hydrophobic silica and the aluminum stearate. By filtering the aggregate and drying it at 80° C., a particulate oil absorber (7) of 15 parts of oil-absorbent, cross-linked polymer (7), 1 parts of the hydrophobic silica and 4 parts of the aluminum stearate, was produced. The particulate oil absorber (7) had an average particle diameter of 2 mm.

Example 8

2 parts of a hydrophobic silica fine powder (supra) and 3 parts of aluminum stearate fine powder (average particle diameter: 5 μm) were added in an aqueous solution in which 1.5 parts of a polyoxyethylene alkylether (supra) had been dissolved in 150 parts of water, and the resultant mixture was stirred at 300 rpm to give rise to a water dispersion of the hydrophobic silica and the aluminum stearate. To the water dispersion obtained, 60 parts of the previous water dispersion containing oil-absorbent, cross-linked polymer (4) was gradually added, and stirring continued for ten minutes to give rise to an aggregate composed of the oil-absorbent, cross-linked polymer (4) and the hydrophobic silica and the aluminum stearate. By filtering the aggregate and drying it at 80° C., a particulate oil absorber (8) of 15 parts of the oil-absorbent, cross-linked polymer (4), 2 parts of the hydrophobic silica and 3 parts of the aluminum stearate, was produced. The particulate oil absorber (8) had an average particle diameter of 2 mm.

Comparative Example 1

The procedure of Example 4 was repeated, except that 94.637 parts of dodecyl acrylate and 5.363 parts of ethylene glycol diacrylate were used instead, thereby a water dispersion containing a comparative polymer (1) having an average particle diameter of 30 μm was produced.

Using the obtained water dispersion and a hydrophobic silica fine powder (supra), the procedure of Example 4 was repeated, thereby a comparative particulate oil absorber (1) of 20 parts of the comparative polymer (1) and 5 parts of the silica was obtained. This comparative particulate oil absorber (1) had an average particle diameter of 2 mm.

Comparative Example 2

The procedure of Example 4 was repeated, except that 39.854 parts of dodecyl acrylate and 59.780 parts of methacrylic acid (SP value: 10.1) were used instead of 99.823 parts of dodecyl acrylate, and the amount of ethylene glycol diacrylate was changed to 0.366 parts, thereby a water dispersion containing a comparative polymer (2) having an average particle diameter of 30 μm was produced.

Using the obtained water dispersion and a hydrophobic silica fine powder (supra), the procedure of Example 4 was repeated, thereby a comparative particulate oil absorber (2) of 20 parts of the comparative polymer (2) and 5 parts of the silica was obtained. This comparative particulate oil absorber (2) had an average particle diameter of 2 mm.

Comparative Example 3

The procedure of Example 4 was repeated, except that the cross-linking monomer (B) was not used, thereby a water dispersion containing a comparative polymer (3) having an average particle diameter of 30 μm was obtained.

Using the obtained water dispersion and a hydrophobic silica fine powder (supra), the procedure of Example 4 was repeated, thereby a comparative particulate oil absorber (3) of 20 parts of the comparative polymer (3) and 5 parts of the silica was obtained. This comparative particulate oil absorber (3) had an average particle diameter of 4 mm.

Comparative Example 4

1 parts of a hydrophobic silica fine powder (supra) was added in an aqueous solution in which 1.5 parts of a polyoxyethylene alkylether (supra) had been dissolved in 150 parts of water. The resultant solution was stirred at 300 rpm to produce a water dispersion of the hydrophobic silica.

To the water dispersion obtained, 800 parts of the water dispersion containing the oil-absorbent, cross-linked polymer (4) obtained in Example 4was gradually added, and stirring continued for ten minutes, thereby an aggregate composed of the oil-absorbent, cross-linked polymer (4) and the silica was produced. The aggregate obtained was filtered, dried at 80° C., and particulated, thereby a comparative, adhesive, particulate oil absorber (4) of 200 parts of the oil-absorbent, cross-linked polymer (4) and 1 parts of the silica was obtained. This comparative particulate oil absorber (4) had an average particle diameter of 8 mm.

Comparative Example 5

5 parts of a hydrophobic silica fine powder (supra) was added in an aqueous solution in which 1.5 parts of a polyoxyethylene alkylether (supra) had been added in 150 parts of water. The resultant solution was stirred at 300 rpm to produce a water dispersion of the silica. To this dispersion obtained, 8 parts of the water dispersion containing the oil-absorbent, cross-linked polymer (4) was gradually added, and stirring continued for ten minutes, thereby an aggregate composed of the oil-absorbent, cross-linked polymer (4) and the silica was produced. The aggregate was filtered, dried at 80° C., and particulated, thereby a comparative particulate oil absorber (5) of 2 parts of the oil-absorbent, cross-linked polymer (4) and 5 parts of the hydrophobic silica was obtained. This comparative oil absorber (5) had an average particle diameter of 0.5 mm.

Comparative Example 6

The procedure of Example 4 was repeated, except that a silica fine powder (sold under the trade name of "Nipsil SS-73" by Nihon Silica K. K. in Japan, M value: 15, average particle diameter: 3 μm) was used instead of the hydrophobic silica fine powder, thereby a comparative particulate oil absorber (6) was produced.

The resultant comparative particulate oil absorber (6) was a heterogeneous aggregate containing mainly an aggregate of the oil-absorbent, cross-linked polymer (4) and a silica aggregate, and had an average particle diameter of 4 mm.

Example 9

1 g of each of the particulate oil absorbers (1)–(8) obtained in Examples 1 to 8, respectively, and the comparative particulate oil absorbers (1)–(6) obtained in Comparative Examples 1 to 6, respectively, were poured in an aluminum dish having a diameter of 5 cm in which 10 g of toluene or 5 g of a machine oil (viscosity: 100 cps) had been poured, and the time until the toluene or machine oil does not fluidize, was measured. The test results are shown in Table 1.

TABLE 1

| Sample | Machine oil (minute) | Toluene (sec) |
|---|---|---|
| Ex. | | |
| 1 Particulate oil absorber (1) | 7 | 9 |
| 2 Particulate oil absorber (2) | 35 | 25 |
| 3 Particulate oil absorber (3) | 12 | 15 |
| 4 Particulate oil absorber (4) | 4 | 6 |
| 5 Particulate oil absorber (5) | 16 | 19 |
| 6 Particulate oil absorber (6) | 30 | 20 |
| 7 Particulate oil absorber (7) | 1o | 8 |
| 8 Particulate oil absorber (8) | 4 | 5 |
| Comp. Ex. | | |
| 1 Comparative particulate oil absorber (1) | *1 | *2 |
| 2 Comparative particulate oil absorber (2) | *1 | *2 |
| 3 Comparative particulate oil absorber (3) | *1 | *2 |
| 4 Comparative particulate oil absorber (4) | >60 | >300 |
| 5 Comparative particulate oil absorber (5) | *1 | *2 |
| 6 Comparative particulate oil absorber (6) | >60 | 120 |

Note:
*1: did not absorb the machine oil five times its own weight.
*2: did not absorb the toluene ten times its own weight.

b. Water insoluble organic acid salt series

Example 10

Three (3) parts of a polyoxyethylene alkylether (supra) dissolved in 300 parts of water was placed in a 500 ml flask equipped with a thermometer, a stirrer, a gas introducing tube and a reflux condenser. With stirring, nitrogen gas was introduced into the flask to replace the air, and the contents of the flask were heated to 40° C. in a current of nitrogen gas. A solution of 99.794 parts of nonylphenyl acrylate (SP value: 8.3) as the monomer (A), 0.206 parts of 1,6-hexanediol diacrylate as the cross-linking monomer (B), and 0.5 parts of benzoilperoxide was added in the flask, and stirring vigorously continued at 750 rpm.

The inner temperature of the flask was then heated to 80° C., and the temperature maintained for two hours to carry out polymerization. The temperature was further heated to 90° C., and maintained for two hours to complete polymerization. As a result, a water dispersion (having a resinous component of 25% by weight) containing an oil-absorbent, cross-linked polymer (8) having an average particle diameter of 30 μm was produced.

Separately, 5 parts of a substantially, water insoluble calcium stearate fine powder (average particle diameter: 8 μm) was added in an aqueous solution in which 1.5 parts of a polyoxyethylene alkylether (supra) had been dissolved in 150 parts of water, and the resultant mixture was stirred at 300 rpm to produce a water dispersion of the calcium stearate. To the water dispersion, 60 parts of the previous water dispersion containing the oil-absorbent, cross-linked polymer (8) was gradually added, and stirring continued for ten minutes to give rise to an aggregate composed of the oil-absorbent, cross-linked polymer (8) and the calcium stearate. By filtering the aggregate and drying it at 80° C., a particulate oil absorber (9) of 15 parts of the oil-absorbent, cross-linked polymer (8) and 5 parts of the calcium stearate was produced. The particulate oil absorber (9) had an average particle diameter of 3 mm.

Example 11

The procedure of Example 10 was repeated, except that 49.930 parts of hexadecyl methacrylate (SP value: 7.8) and 49.930 parts of N-octyl methacrylamide (SP value: 8.6) as the monomer (A), and 0.140 part of divinylbenzene as the cross-linking monomer (B) were used instead, and the revolution was changed to 200 rpm, thereby a water dispersion (containing a resinous component of 25% by weight) containing an oil-absorbent, cross-linked polymer (9) having an average particle diameter of 300 μm was produced.

Separately, 5 parts of a water insoluble calcium stearate fine powder (supra) was added in an aqueous solution in which 1.5 parts of a polyoxyethylene alkylether (supra) had been dissolved in 150 parts of water, and the resultant mixture was stirred at 300 rpm to produce a water dispersion of the calcium stearate. To the water dispersion obtained, 180 parts of the previous water dispersion containing the oil-absorbent, cross-linked polymer (9) was gradually added and stirring continued for ten minutes to give rise to an aggregate composed of the oil-absorbent, cross-linked polymer (9) and the calcium stearate. By filtering the aggregate and drying it at 80° C., a particulate oil absorber (10) of 45 parts of the oil-absorbent, cross-linked polymer (9) and 5 parts of the calcium stearate was produced. The particulate oil absorber (10) had an average particle diameter of 5 mm.

Example 12

A monomer solution of 57.772 parts of dodecyl acrylate (SP value: 7.9) and 38.515 parts of N,N-dioctyl acrylamide as the monomer (A), 3.713 parts of polypropylene glycol dimethacrylate (molecular weight: 4000) as the cross-linking monomer (B), and 0.5 parts of 2,2'-azobisisobutyronitrile as the polymerization initiator was added in an aqueous solution in which 3 parts of a polyoxyethylene alkylether (supra) had been dissolved in 300 parts of water. The resultant mixture was stirred at 10000 rpm for ten minutes to produce a water dispersion of the monomer.

The resultant water dispersion was poured in a 500 ml flask equipped with a thermometer, a stirrer, a gas introducing tube, and a reflux condenser. With stirring at 400 rpm, nitrogen gas was introduced in the flask through the gas introducing tube. Under a current of nitrogen gas, the inner temperature of the flask Was heated to 70° C., and the temperature maintained for two hours to carry out polymerization. The inner temperature was then heated to 90° C. so as to complete polymerization, thereby producing a water dispersion (having a resinous component of 25% by weight) containing an oil-absorbent, cross-linked polymer (10) having an average particle diameter of 5 μm.

Separately, 5 parts of a substantially, water insoluble zinc caprylate fine powder (average particle diameter: 6 μm) was added in an aqueous solution in which 1.5 parts of a polyoxyethylene alkylether (supra) had been dissolved in 150 parts of water, and the resultant mixture was stirred at 300 rpm to give rise to a water dispersion of the zinc caprylate. To the water dispersion obtained, 30 parts of the previous water dispersion containing the oil-absorbent, cross-linked polymer (10) was gradually added, and stirring continued for ten minutes to give rise to an aggregate composed of the oil-absorbent, cross-linked polymer (10) and the zinc caprylate. By filtering the aggregate and drying it at 80° C., a particulate oil absorber (11) of 7.5 parts of the oil-absorbent, cross-linked polymer (10) and 5 parts of the zinc caprylate was produced. The particulate oil absorber (11) had an average particle diameter of 3 mm.

Example 13

The procedure of Example 10 was repeated, except that 99.823 parts of dodecyl acrylate (SP value: 7.9) as the monomer (A) and 0.177 parts of ethylene glycol diacrylate as the cross-linking monomer (B) were used instead, thereby a water dispersion (having a resinous component of 25% by weight) containing an oil-absorbent, cross-linked polymer (11) having an average particle diameter of 30 μm was produced.

Separately, 5 parts of a substantially, water insoluble aluminium stearate fine powder (average particle diameter: 5 μm) was added in an aqueous solution in which 1.5 parts of a polyoxyethylene alkylether (supra) had been dissolved in 150 parts of water, and the resultant mixture was stirred at 300 rpm to give rise to a water dispersion of the aluminium stearate. To the water dispersion obtained, 60 parts of the previous water dispersion containing the oil-absorbent, cross-linked polymer (11) was gradually added, and stirring continued for ten minutes to give rise to an aggregate composed of the oil-absorbent, cross-linked polymer (11) and the aluminium stearate. By filtering the aggregate and drying it at 80° C., a particulate oil absorber (12) of 15 parts of the oil-absorbent, cross-linked polymer (11) and 5 parts of the aluminium stearate was produced. The particulate oil absorber (12) had an average particle diameter of 3 mm.

Example 14

The procedure of Example 10 was repeated, except that 54.881 parts of t-butyl styrene (SP value: 7.9) and 44.903 parts of 1-decene (SP value: 7.0) as the monomer (A), and 0.216 parts of divinylbenzene were used instead, thereby producing a water dispersion (having a resinous component of 25% by weight) containing an oil-absorbent, cross-linked polymer (12). The oil-absorbent, cross-linked polymer (12) was filtered from the water-dispersion, dried, and then particulated using a colloidal mill, thereby producing the particulate of oil-absorbent, cross-linked polymer (12) having an average particle diameter of 5 μm.

75 parts of the resultant particulate oil-absorbent, cross-linked polymer (12) and 25 parts of aluminium stearate (supra) were mixed and granulated together using a colloidal mill, thereby producing a particulate oil absorber (13). The particulate oil absorber (13) had an average particle diameter of 1 mm.

Example 15

The procedure of Example 10 was repeated, except that 74.793 parts of nonylphenyl acrylate (SP value: 8.3) and 24.931 parts of hydroxyethyl acrylate (SP value: 10.3) as the monomer (A) were used instead, and the amount of 1,6-hexandiol diacrylate as the cross-linked monomer (B) was changed to 0.276 parts, thereby producing a water dispersion (having a resinous component of 25% by weight) containing an oil-absorbent, cross-linked polymer (13) having an average particle diameter of 30 μm.

Separately, 5 parts of a substantially, water insoluble barium behenate fine powder (average particle diameter: 8 μm) was added in an aqueous solution in which 1.5 parts of a polyoxyethylene alkylether (supra) had been dissolved in 150 parts of water, and the resultant mixture was stirred at 300 rpm to give rise to a water dispersion of the barium behenate. To the water dispersion obtained, 60 parts of the previous water dispersion containing the oil-absorbent, cross-linked polymer (13) was gradually added, and stirring continued for ten minutes to give rise to an aggregate composed of the oil-absorbent, cross-linked polymer (13) and the barium behenate. By filtering the aggregate and drying it at 80° C., a particulate oil absorber (14) of 15 parts of the oil-absorbent, cross-linked polymer (13) and 5 parts of the barium behenate was produced. The particulate oil absorber (14) had an average particle diameter of 3 mm.

Example 16

The procedure of Example 10 was repeated, except that 99.811 parts of vinyl laurate (SP value: 7.9) as the monomer (A), and 0.187 parts of trimethylol propane triacrylate as the cross-linked monomer (B) were used instead, thereby producing a water dispersion (having a resinous component of 25% by weight) containing an oil-absorbent, cross-linked polymer (14) having an average particle diameter of 30 μm.

Separately, 5 parts of a substantially, water insoluble aluminium stearate fine powder (supra) was added in an aqueous solution in which 1.5 parts of a polyoxyethylene alkylether (supra) had been dissolved in 150 parts of water, and the resultant mixture was stirred at 300 rpm to give rise to a water dispersion of the aluminium stearate. To the water dispersion obtained, 60 parts of the previous water dispersion containing the oil-absorbent, cross-linked polymer (14) was gradually added, and stirring continued for ten minutes to give rise to an aggregate composed of the oil-absorbent, cross-linked polymer (14) and the aluminium stearate. By filtering the aggregate and drying it at 80° C., a particulate oil absorber (15) of 15 parts of the oil-absorbent, cross-linked polymer (14) and 5 parts of the aluminium stearate was produced. The particulate oil absorber (15) had an average particle diameter of 3 mm.

Comparative Example 7

The procedure of Example 13 was repeated, except that the amount of dodecyl acrylate was changed to 94.637 parts, and the amount of ethylene glycol diacrylate changed to 5.363 parts, thereby producing a water dispersion containing the comparative polymer (4) having an average particle diameter of 30 µm.

Using the resultant water dispersion and aluminium stearate in accordance with the procedure of Example 13, a comparative oil absorber (7) composed of 15 parts of the comparative polymer (4) and 5 parts of aluminium stearate. The comparative oil absorber (7) had an average particle diameter of 3 mm.

Comparative Example 8

The procedure of Example 13 was repeated, except that 39.854 parts of dodecyl acrylate and 59.780 parts of methacrylic acid (SP value: 10.1) were used instead of 99.823 parts of dodecyl acrylate as the monomer (A), and the amount of ethylene glycol diacrylate was changed to 0.366 parts, thereby producing a water dispersion containing a comparative polymer (5) having an average particle diameter of 30 µm.

Using the resultant water dispersion and aluminium stearate in accordance with the procedure of Example 13, a comparative oil absorber (8) composed of 15 parts of the comparative polymer (5) and 5 parts of the aluminium stearate was produced. The comparative oil absorber (8) had an average particle diameter of 3 mm.

Comparative Example 9

The procedure of Example 13 was repeated, except that the cross-linking monomer (B) was not used, thereby producing a water dispersion of the comparative polymer (6) having an average particle diameter of 30 µm.

Using the resultant water dispersion and aluminium stearate in accordance with the procedure of Example 13, a comparative oil absorber (9) composed of 15 parts of the comparative polymer (6) and 5 parts of the aluminium stearate was produced. The comparative oil absorber (9) had an average particle diameter of 3 mm.

Comparative Example 10

1 parts of an aluminium stearate fine powder (supra) was added in an aqueous solution in which 1.5 parts of a polyoxyethylene alkylether had been dissolved in 150 parts of water. The mixture was stirred at 300 rpm to produce a water dispersion of the aluminium stearate.

To the dispersion obtained, 800 parts of the water dispersion containing an oil-absorbent, cross-linked polymer (11) which has been produced in Example 13, was gradually added, and stirring continued for ten minutes to give rise to an aggregate composed of the oil-absorbent, cross-linked polymer (11) and the aluminium stearate. The aggregate was filtered, particulated using a colloidal mill, and dried at 80° C., thereby producing a comparative oil absorber (10) of 200 parts of the oil-absorbent, cross-linked polymer (11) and one part of the aluminium stearate. The comparative oil absorber (10) had an average particle diameter of 7 mm.

Comparative Example 11

5 parts of an aluminium stearate fine powder (supra) was added in an aqueous solution in which 1.5 parts of a polyoxyethylene alkylether (supra) had been dissolved in 150 parts of water. The resultant mixture was stirred at 300 rpm to produce a water dispersion of the aluminium stearate.

To the dispersion, 8 parts of the water dispersion containing an oil-absorbent, cross-linked polymer (11) which has been produced in Example 13, was gradually added, and stirring continued for ten minutes to give rise to an aggregate composed of the oil-absorbent, cross-linked polymer (11) and the aluminium stearate. The aggregate was filtered, and dried at 80° C., thereby producing a comparative oil absorber (11) of 2 parts of the oil-absorbent, cross-linked polymer (11) and 5 parts of the aluminium stearate. The comparative oil absorber (11) had an average particle diameter of 3 mm.

Example 17

5 g of each of the particulate oil absorbers (9)–(15) obtained in Examples 10–16, respectively, and the comparative oil absorbers (7)–(11) obtained in Comparative Examples 7–11, respectively, were soaked in kerosene at 20° C. for 24 hours, and then put out on a 508 mesh filter cloth of nylon. Excess kerosene was removed and the absorber was measured in weight. The saturated absorbed oil was calculated by the following formula:

The saturated absorbed oil (g)=weight of the oil absorber after soaking—weight of the oil absorber before soaking The test results are shown in Table 2.

Example 18

5 g of each of the particulate oil absorbers (9)–(15) obtained in Examples 10–16, respectively, and the comparative oil absorbers (7)–(11) obtained in Comparative Examples 7–11, respectively, were poured in a cylindrical, glass tube having an inner diameter of 20 mm. To the tube, half of the saturated absorbed oil, which had been calculated in Example 17, of kerosene was poured at a time, and the time (oil absorbing time) until the kerosene does not fluidize, was measured. The rest results are shown in Table 2.

TABLE 2

| Sample | | Absorbed oil (g) | Oil absorbing time (sec) |
|---|---|---|---|
| Ex. | | | |
| 10 | Particulate oil absorber (9) | 42.1 | 15 |
| 11 | Particulate oil absorber (10) | 42.8 | 35 |
| 12 | Particulate oil absorber (11) | 32.3 | 12 |
| 13 | Particulate oil absorber (12) | 43.5 | 9 |
| 14 | Particulate oil absorber (13) | 40.7 | 18 |
| 15 | Particulate oil absorber (14) | 34.2 | 15 |
| 16 | Particulate oil absorber (15) | 41.2 | 12 |
| Comp. Ex. | | | |
| 7 | Comparative oil absorber (7) | 15.2 | 15 |
| 8 | Comparative oil absorber (8) | 10.2 | 16 |
| 9 | Comparative oil absorber (9) | 19.3 | 55 |
| 10 | Comparative oil absorber (10) | 48.9 | >900 |
| 11 | Comparative oil absorber (11) | 16.5 | 12 |

II. Oil-absorbent material
a. Hydrophobic inorganic compound series

Examples 19–26

90 parts of each of the particulate oil absorbers, which are indicated in Table 3, 5 parts of a fiber consist of 70% by weight of a corrugated board used-paper and 30% by weight of a rayon fiber (diameter: 3d, length: 5 mm), and 5 parts of a low melting point polyethylene powder as the adhesive were mixed together. The mixture was deposited on a 100 mesh metal net by suction, thereby forming a nonwoven cloth having a basis weight of 700 g/m². The resultant nonwoven was heated at 110° C. in order to fix the particulate oil absorber in the fibers. By depositing the particulate oil absorber on the dried nonwoven mat, each of the oil-absorbent materials (1)–(8) were obtained, respectively.

Comparative Examples 12–17

The procedure of Example 19 was repeated, except that each of the comparative oil absorbers, which are indicated in Table 3, were used instead of the particulate oil absorber, thereby each of comparative oil-absorbent materials (1)–(6) were obtained, respectively.

Example 27

90 parts of the particulate oil absorber (4) obtained in Example 4, 10 parts of a fiber consist of 50% by weight of a polypropylene chop (sold by Tisso K. K. in Japan, diameter: 3d, length: 3 mm) and 50% by weight of a heat adhesive fiber (sold under the trade name of "ES FIBER" by Tisso K. K. in Japan, diameter: 3d, length: 5 mm) were mixed together. The mixture was deposited on a 100 mesh metal net by suction, thereby forming a nonwoven cloth having a basis weight of 50 g/m².

By putting on the resultant nonwoven cloth a span bond nonwoven cloth having a basis weight of 50 g/m², heating it at 130° C. so as to fix the particulate oil absorber (4) in the fibers used, an oil-absorbent material (9) in which the particulate oil absorber (4) was deposited on the fibers, was produced.

Comparative Examples 18–20

The procedure of Example 27 was repeated, except that each of the comparative oil absorbers, which are indicated in table 3, were used instead of the particulate oil absorber (4), thereby each of comparative oil-absorbent materials (7)–(9), respectively.

Example 28

95 parts of the particulate oil absorber (4) obtained in Example 4, 2.5 parts of a fiber consist of 70% by weight of an acryl fiber (sold under the trade name of "Kanekalon KCE2" by Kanekafuchi Kagaku K. K. in Japan, diameter: 3d, length: 10 mm) and 30% by weight of a nylon fiber (diameter: 5d, length: 26 mm), and 2.5 parts of a low melting polyethylene powder as the adhesive were mixed together in 1000 parts of water. The resultant water dispersion was allowed to be deposited on a metal mesh by filtration, and dried at 120° C. in a dryer to form a nonwoven cloth having a basis weight of 200 g/m², thereby forming an oil-absorbent material (10) in which the particulate oil absorber (4) was deposited on the wet-nonwoven mat.

Comparative Examples 21–23

The procedure of Example 28 was repeated, except that each of the comparative absorbers, which are indicated in Table 3, was used instead of the particulate oil absorber (4), thereby forming each of comparative oil-absorbent materials (10)–(12), respectively.

Example 29

15 parts of the particulate oil absorber (4) obtained in Example 4, and 10 parts of an acrylic emulsion adhesive (sold under the trade name of "PS-4517" by Nippon Shokubai Co., Ltd., in Japan, 50% water dispersion) were mixed together to produce a water dispersion.

All of the resultant water dispersion was sprayed on 15 parts of a nonwoven substrate in which a porous polypropylene nonwoven cloth (basis weight: 100 g/m², bulk density: 0.05 g/cm³) was put on a span bond nonwoven cloth (basis weight: 50 g/m²). The sprayed substrate was vibrated to infiltrate the water dispersion into the inner portion of the substrate.

An additional span bond nonwoven cloth (basis weight: 50 g/m²) was superposed on the porous nonwoven cloth. The superposed was heated at 130° C. so as to fix the particulate oil absorber (4) in the fibers. As a result, an oil-absorbent material (11) in which the particulate oil absorber (4) was deposited in the dry nonwoven mat, was produced.

Comparative Examples 24–26

The procedure of Example 29 was repeated, except that each of the comparative oil absorbers, which are indicated in Table 3, was used instead of the particulate oil absorber (4), thereby forming each of comparative oil-absorbent materials (13)–(15), respectively.

Example 30

Each of the oil-absorbent materials (1)–(11) obtained in Examples 19–29, respectively, and the comparative oil-absorbent materials (1)–(15) obtained in Comparative Examples 12–26, respectively, were soaked in kerosene at 20° C. for one minute, then pulled up, and put on a 200 mesh metal net for one minute so as to remove excess kerosene therefrom. The amount of absorbed oil (g) and oil absorbing rate (%), per 1 g of the oil-absorbent material were calculated by the following formulae:

The amount of absorbed oil (g)=(weight of the oil-absorbent material after oil thrower)—(weight of the oil-absorbent material before soaking)

The oil-absorbing rate (%)=(the amount of absorbed oil/weight of the oil-absorbent material before soaking) ×100

After oil thrower, each oil-absorbent material was put on a 200 mesh metal net, then subjected to a downward load of 20 g/cm² for one minute. The amount of effluent oil was measured. The oil-maintaining rate was then calculated by the following formula:

The oil-maintaining rate (%)={(the amount of absorbed oil—the amount of effluent oil)/the amount of absorbed oil}×100

The test results are shown in Table 3.

TABLE 3

| Ex. | Oil-absorbent material | Particulate oil absorber | Oil-absorbing rate (%) | Oil-maintaining rate (%) |
|---|---|---|---|---|
| 19 | (1) | (1) | 1020 | 88.4 |
| 20 | (2) | (2) | 992 | 84.8 |
| 21 | (3) | (*1) | 972 | 90.3 |
| 22 | (4) | (4) | 1047 | 92.0 |
| 23 | (5) | (5) | 990 | 85.2 |
| 24 | (6) | (6) | 855 | 87.1 |
| 25 | (7) | (7) | 995 | 85.5 |
| 26 | (8) | (8) | 1095 | 91.4 |
| 27 | (9) | (4) | 1120 | 82.6 |
| 28 | (10) | (4) | 1031 | 84.2 |
| 29 | (11) | (4) | 849 | 83.3 |

TABLE 3-continued

| Comp. Ex. | Comparative oil-absorbent material | Comparative oil absorber | Oil-absorbing rate (%) | Oil maintaining rate (%) |
|---|---|---|---|---|
| 12 | (1) | (1) | 372 | 66.4 |
| 13 | (2) | (2) | 247 | 71.7 |
| 14 | (3) | (3) | 444 | 75.8 |
| 15 | (4) | (4) | 151 | 64.1 |
| 16 | (5) | (5) | 211 | 62.8 |
| 17 | (6) | (6) | 415 | 72.1 |
| 18 | (7) | (4) | 163 | 60.3 |
| 19 | (8) | (5) | 229 | 60.1 |
| 20 | (9) | (6) | 441 | 64.9 |
| 21 | (10) | (4) | 149 | 63.7 |
| 22 | (11) | (5) | 203 | 60.8 |
| 23 | (12) | (6) | 410 | 65.0 |
| 24 | (13) | (4) | 145 | 62.2 |
| 25 | (14) | (5) | 199 | 64.7 |
| 26 | (15) | (6) | 355 | 66.7 |

Note:

(*1) Particulate oil absorber was obtained as follows:

5 parts of an hydrophobic silica fine powder (supra) was added in an aqueous solution in which 1.5 parts of a polyoxyethylene alkylether (supra) had been dissolved in 150 parts of water. The resultant mixture was stirred at 300 rpm to produce a water dispersion of the silica. To the dispersion, 30 parts of the water dispersion containing an oil-absorbent, cross-linked polymer (3) obtained in Example 3 was gradually added, and stirring continued for ten minutes, thereby producing an aggregate composed of the oil-absorbent, cross-linked polymer (3) and the silica. The resultant aggregate was filtered, dried at 80° C., and strongly particulated, thereby producing a particulate of 0.2 mm and composed of 7.5 parts of the oil-absorbent, cross-linked polymer (3) and 5 parts of the silica.

b. Water insoluble organic acid salt series

Example 31

5 parts of an aluminium monostearate fine powder (average particle diameter: 10 μm) was added in an aqueous solution in which 1.5 parts of sodium stearate had been dissolved in 150 parts of water. The mixture was stirred at 300 rpm to produce a water dispersion of the aluminium monostearate. To the water dispersion obtained, 60 parts of the water dispersion containing a cross-linked polymer (8) obtained in Example 10 was gradually added, and stirring continued for ten minutes, thereby producing an aggregate composed of the cross-linked polymer (8) and the aluminium monostearate. The obtained aggregate was filtered, then washed with water, and dried at 80° C., thereby producing a particulate oil absorber (16) of 15 parts of the cross-linked polymer (8) and 5 parts of the aluminium monostearate. The particulate oil absorber (16) had an average particle diameter of 3 mm.

90 parts of the resultant particulate oil absorber (16), 5 parts of a fiber consist of 70% by weight of a corrugated board used paper and 30% by weight of a rayon fiber (diameter: 3d, length: 5 mm), and 5 parts of a low melting polyethylene powder as the adhesive were mixed together. The resultant mixture was deposited on a 100 mesh metal net by suction so as to form a nonwoven cloth having a basis weight of 700 g/m². The resultant nonwoven was dried at 110° C. in order to fix the particulate oil absorber (16) in the fibers used, thereby producing an oil-absorbent material (12) in which the particulate oil absorber (16) was deposited on the dry nonwoven mat.

Example 32

The procedure of Example 31 was repeated, except that the particulate oil absorber (10) obtained in Example 11 was used instead of the particulate oil absorber (16), thereby producing an oil-absorbent material (13).

Example 33

5 parts of an aluminium monostearate fine powder (average particle diameter: 8 μm) was added in an aqueous solution in which 1.5 parts of sodium stearate had been dissolved in 150 parts of water. The resultant mixture was stirred at 300 rpm to produce a water dispersion of the aluminium monostearate. To the water dispersion obtained, 60 parts of the water dispersion containing a cross-linked polymer (11) obtained in Example 13 was gradually added, and stirring continued for ten minutes, thereby producing an aggregate composed of the cross-linked polymer (11) and the aluminium monostearate. The obtained aggregate was filtered, then washed with water, and dried at 80° C., thereby producing a particulate oil absorber (17) of 15 parts of the cross-linked polymer (11) and 5 parts of the aluminium monostearate. The particulate oil absorber (17) had an average particle diameter of 3 mm.

The procedure of Example 31 was repeated, except that the particulate oil absorber (17) was used instead of the particulate oil absorber (16), thereby producing an oil-absorbent material (14).

Example 34

The procedure of Example 27 was repeated, except that the particulate oil absorber (17) was used instead of the particulate oil absorber (4), thereby producing an oil-absorbent material (15).

Example 35

The procedure of Example 28 was repeated, except that the particulate oil absorber (17) was used instead of the particulate oil absorber (4), thereby producing an oil-absorbent material (16).

Example 36

The procedure of Example 29 was repeated, except that the particulate oil absorber (17) was used instead of the particulate oil absorber (4), and the bulk density of the porous polypropylene nonwoven cloth was changed to 0.1 g/cm³, thereby producing an oil-absorbent material (17).

Comparative Examples 27–31

The procedure of Example 31 was repeated, except that each of the comparative oil absorbers, which are indicated in Table 4, was used instead of the particulate oil absorber (16), thereby producing each of comparative oil-absorbent materials (16)–(20) shown in Table 4.

Example 37

The procedure of Example 30 was repeated, except that each of the oil-absorbent materials (12)–(17) obtained in Examples 31–36, respectively, and the comparative oil-absorbent materials (16)–(20) obtained in Comparative Examples 27–31, respectively was used instead as the sample.

In addition, the porous polypropylene nonwoven cloth (basis weight: 100 g/cm², bulk density: 0.1 g/cm³) was run parallel as the reference.

The test results are shown in Table 4.

TABLE 4

| Ex. | Oil-absorbent material | Particulate oil absorber | Oil-absorbing rate (%) | Oil-maintaining rate (%) |
|---|---|---|---|---|
| 31 | (12) | (16) | 981 | 87.2 |
| 32 | (13) | (10) | 988 | 84.6 |
| 33 | (14) | (17) | 1031 | 91.8 |
| 34 | (15) | (17) | 1132 | 81.9 |
| 35 | (16) | (17) | 1016 | 83.3 |
| 36 | (17) | (17) | 820 | 82.7 |

| Comp. Ex. | Comparative oil-absorbent material | Comparative oil absorber | Oil-absorbing rate (%) | Oil maintaining rate (%) |
|---|---|---|---|---|
| 27 | (16) | (7) | 386 | 65.6 |
| 28 | (17) | (8) | 255 | 72.1 |
| 29 | (18) | (9) | 428 | 73.7 |
| 30 | (19) | (10) | 152 | 64.9 |
| 31 | (20) | (11) | 223 | 64.4 |
| | Polypropylene nonwoven cloth | | 942 | 15.3 |

III. Oil-absorbent pack
i. Particulate oil absorber
a. Hydrophobic inorganic compound series Examples 38–42 and 45

10 g of each of the particulate oil absorbers, which are indicated in Table 5, was packed into a porous bag having sizes of 10 cm×7.5 cm and made of a polypropylene nonwoven cloth (basis weight: 50 g/m², pore size: 90 µm), and the fill opening of the bag was melted to close, thereby producing oil-absorbent packs (1)–(5) and (8), respectively.

Example 43

5 parts of a hydrophobic alumina fine powder (sold under the trade name of "RFY-C" by Nihon Aerogil K. K. in Japan, M value: 50, average particle diameter: 3 µm) was added in an aqueous solution in which 1.5 part of a polyoxyethylene alkylether (supra) had been dissolved in 150 parts of water. The mixture was stirred at 300 rpm to produce a water dispersion of the alumina. To the resultant water dispersion, 60 parts of the water dispersion containing an oil-absorbent, cross-linked polymer (6) synthesized in Example 6, was gradually added, and stirring continued for ten minutes, thereby producing 216.5 parts of a water dispersion containing an aggregate composed of 15 parts of the oil-absorbent, cross-linked polymer (6) and 5 parts of the alumina.

108.25 g (10 g as an aggregate) of the resultant water dispersion was packed into a porous bag having sizes of 10 cm×7.5 cm and made of a polyester nonwoven cloth (basis weight: 50 g/m², pore size: 100 µm), and the fill opening of the bag was melted to close. Excess water thereof was rolled out, and the rolled bag dried at 60° C., thereby producing an oil-absorbent pack (6).

Example 44

10 g of the particulate oil absorber (7) obtained in Example 7 was packed into a porous bag having sizes of 10 cm×7.5 cm and made of a nylon nonwoven cloth (basis weight: 50 g/m², pore size: 90 µm), and the fill opening of the bag was adhered, thereby producing an oil-absorbent pack (7).

Comparative Examples 32–37

The procedure of Example 41 was repeated, except that each of the comparative oil absorbers, which are indicated in Table 5, was used instead of the particulate oil-absorber, thereby producing comparative oil-absorbent packs (1)–(6), respectively.

Example 46

The procedure of Example 30 was repeated, except that each of the oil-absorbent packs (1)–(8) and the comparative oil-absorbent packs (1)–(6) was used instead of the oil-absorbent material.

A reference that 10 g of a commercial polypropylene nonwoven cloth (10 cm×25 cm, basis weight: 400 g/m², bulk density: 0.1 g/cm³) had been filled into the same bag used in Example 38, was parallel run.

These test results are shown in Table 5.

TABLE 5

| Ex. | Oil-absorbent pack | Particulate oil absorber | Absorbed oil (g) | Oil-maintaining rate (%) |
|---|---|---|---|---|
| 38 | (1) | (1) | 100.2 | 84.4 |
| 39 | (2) | (2) | 93.5 | 89.2 |
| 40 | (3) | (*1) | 74.8 | 81.1 |
| 41 | (4) | (4) | 103.4 | 88.2 |
| 42 | (5) | (5) | 94.4 | 82.5 |
| 43 | (6) | — | 80.7 | 82.8 |
| 44 | (7) | (7) | 98.9 | 86.7 |
| 45 | (8) | (8) | 102.8 | 89.1 |

| Comp. Ex. | Comparative oil-absorbent pack | Comparative oil absorber | Absorbed oil (g) | Oil-maintaining rate (%) |
|---|---|---|---|---|
| 32 | (1) | (1) | 39.1 | 79.7 |
| 33 | (2) | (2) | 30.4 | 79.2 |
| 34 | (3) | (3) | 44.2 | 78.7 |
| 35 | (4) | (4) | 21.1 | 79.1 |
| 36 | (5) | (5) | 40.2 | 78.0 |
| 37 | (6) | (6) | 48.3 | 81.1 |
| | Polypropylene nonwoven cloth | | 94.2 | 15.3 |

Note:
(*1) Particulate oil absorber was obtained as follows:
  5 parts of an hydrophobic silica fine powder (supra) was added in an aqueous solution in which 1.5 parts of a polyoxyethylene alkylether (supra) had been dissolved in 150 parts of water. The resultant mixture was stirred at 300 rpm to produce a water dispersion of the hydrophobic silica. To the dispersion, 30 parts of the water dispersion containing an oil-absorbent, cross-linked polymer (3) obtained in Example 3 was gradually added, and stirring continued for ten minutes, thereby producing an aggregate composed of the oil-absorbent, cross-linked polymer (3) and the hydrophobic silica. The resultant aggregate was filtered, dried at 80° C., and strongly particulated, thereby producing a particulate of 0.2 mm and composed of 7.5 parts of the oil-absorbent, cross-linked polymer (3) and 5 parts of the silica.

b. Water insoluble organic acid salt series

Examples 47–51

The procedure of Example 38 was repeated, except that each of the particulate oil absorbers, which are indicated in Table 6, was used instead of the particulate oil absorber, thereby producing oil-absorbent packs (9)–(13), respectively.

Example 52

5 parts of an hydrophobic barium behenate fine powder (in Example 10) was added in an aqueous solution in which 1.5 parts of a polyoxyethylene alkylether (supra) had been dissolved in 150 parts of water. The resultant mixture was stirred at 300 rpm to produce a water dispersion of the barium behenate. To the dispersion, 60 parts of the water dispersion containing an oil-absorbent, cross-linked polymer (13) obtained in Example 15 was gradually added, and stirring continued for ten minutes, thereby producing 216.5 parts of a water dispersion of 15 parts of the oil-absorbent, cross-linked polymer (13) and 5 parts of the barium behenate.

108.25 g (10 g as an aggregate) of the resultant water dispersion was packed into a porous bag having sizes of 10 cm×7.5 cm and made of a polyester nonwoven cloth (basis weight: 50 g/m², pore size: 100 μm), the fill opening of the bag was melted to close. Excess water thereof was rolled out, and the rolled bag dried at 60° C., thereby producing an oil-absorbent pack (14).

Example 53

10 g of the particulate oil absorber (15) obtained in Example 16 was packed into a porous bag having sizes of 10 cm×7.5 cm and made of a nylon nonwoven cloth (basis weight: 50 g/m², pore size: 90 μm), and the fill opening of the bag was adhered, thereby producing an oil-absorbent pack (15).

Comparative Examples 38–42

The procedure of Example 38 was repeated, except that each of the comparative oil absorbers, which are indicated in Table 6, was used instead of the particulate oil absorber, thereby producing comparative oil-absorbent packs (7)–(11), respectively.

Example 54

The procedure of Example 30 was repeated, except that each of the oil-absorbent packs (9)–(15) and the comparative oil-absorbent packs (7)–(11) was used instead of the oil-absorbent material, respectively.

These test results are shown in Table 6.

Example 55

99 parts of the particulate oil absorber (17) synthesized in Example 33,1 parts of a heat adhesive fiber (sold under the trade name of "ES FIBER" by Tisso K. K. in Japan, diameter: 3d, length: 5 mm) were mixed together in 1000 parts of water. The resultant mixture was deposited on a metal net by filtration, then dehydrated, and dried at 120° C., thereby forming a nonwoven cloth having a basis weight of 200 g/m².

A sheet of the nonwoven cloth obtained was cut into a piece of 10 cm×10 cm. This was sandwiched with an acrylic nonwoven cloth of 12 cm×12 cm (basis weight of 50 g/m²) and an acrylic film of 12 cm×12 cm (thickness of 0.05 mm). All edges of the resultant laminates was heat-sealed, thereby forming an oil-absorbent pack (16) in which the oil-absorbent material was enclosed in the laminate.

The properties of the resultant oil-absorbent pack (16) was measured according to the method of Example 30. The test results are shown in Table 7.

Example 56

Both sides of a needle punch cloth which is made of polypropylene, of 10 cm×10 cm, and having a basis weight of 200 g/m², and a bulk density of 0.1 g/cm³, was sprayed with an acrylic resin, solvent type adhesive, and dried. The particulate oil absorber (17) was deposited on the sprayed nonwoven cloth by spreading. The amount of the particulate oil absorber (17) adhered to the nonwoven cloth was 600 g/m².

The treated nonwoven cloth was sandwiched with a polyester nonwoven cloth having a basis weight of 50 g/m², the cloth 24 cm×12 cm being held in two, e.g. the size held was 12 cm×12 cm, the three edge portions thereof were heat-sealed, thereby forming an oil-absorbent pack (17) of 12 cm×12 cm in which the nonwoven cloth deposited the particulate oil absorber (17) was enclosed in the bag.

The properties of the resultant oil-absorbent pack (17) was measured according to the method of Example 30. The test results are shown in Table 7.

TABLE 6

| Ex. | Oil-absorbent pack | Particulate oil absorber | Absorbed oil (g) | Oil-maintaining rate (%) |
|---|---|---|---|---|
| 47 | (9) | (9) | 99.1 | 85.1 |
| 48 | (10) | (10) | 94.1 | 91.9 |
| 49 | (11) | (11) | 79.7 | 82A |
| 50 | (12) | (12) | 101.2 | 87.1 |
| 51 | (13) | (13) | 97.9 | 84.6 |
| 52 | (14) | — | 83.4 | 84.7 |
| 53 | (15) | (15) | 96.9 | 85.2 |

| Comp. Ex. | Comparative oil-absorbent pack | Comparative oil absorber | Absorbed oil (g) | Oil-maintaining rate (%) |
|---|---|---|---|---|
| 38 | (7) | (7) | 37.5 | 79.8 |
| 39 | (8) | (8) | 28.5 | 77.8 |
| 40 | (9) | (9) | 47.2 | 79.7 |
| 41 | (10) | (10) | 15.4 | 80.6 |
| 42 | (11) | (11) | 42.4 | 78.0 |
|  | Polypropylene nonwoven cloth |  | 94.2 | 15.3 | ii. Oil-absorbent material
b. Water insoluble organic acid salt series

TABLE 7

| Ex. | Oil-absorbent pack | Particulate oil absorber | Absorbed oil (g) | Oil-maintaining rate (%) |
|---|---|---|---|---|
| 55 | (16) | (17) | 1260 | 91.3 |
| 56 | (17) | (17) | 854 | 80.9 |

What is claimed is:

1. A method for producing an absorbent, which comprises:

mixing and dispersing 50 to 95 parts by weight of (1) an oil-absorbent, cross-linked polymer formed from 96–99.999% by weight of (A) a monomer having a polymerizable unsaturated group in the molecule, said monomer (A) containing mainly a monomer having a solubility parameter of not more than 9, and 4–0.001% by weight of (B) a cross-linking monomer having at least two polymerizable unsaturated groups in the molecule, provided the sum of monomer (A) and cross-linking monomer (B) is 100%, with 50 to 5 parts by weight of (IV) at least one compound selected from the group consisting of a hydrophobically-treated silica and a hydrophobically-treated alumina provided the sum of oil-absorbent, cross-linked polymer (I) and compound (IV) is 100 parts by weight in an aqueous medium; and then aggregating and granulating the resultant mixture to form a granular powder having an average particle diameter of 0.01–20 mm.

2. The method according to claim 1, wherein said monomer (A) mainly contains at least one unsaturated compound selected from the group consisting of an alkyl (meth) acrylate, an alkylaryl (meth)acrylate, an alkyl (meth) acrylamide, an alkylaryl (meth)acrylamide, a fatty acid vinyl ester, an alkyl styrene and an alpha-olefin, said compound having at least one fatty hydrocarbon group of 3–30 carbon atoms.

3. The method according to claim 1, wherein said cross-linking monomer (B) is selected from the group consisting of a (meth)acrylate and a divinylbenzene.

4. The method according to claim 1, wherein said compound (IV) is a hydrophobically-treated silica.

5. The method according to claim 1, wherein said compound (IV) is a hydrophobically-treated alumina.

6. The method according to claim 1, wherein said oil-absorbent, cross-linked polymer (I) is a granular powder having an average particle diameter of 0.5 to 500 μm, and said compound (IV) is a powder having an average particle diameter of 0.01 to 300 μm.

7. The method according to claim 1, wherein the ratio of oil-absorbent, cross-linked polymer (I) to compound (IV) is 50–95 to 50–5 parts by weight.

8. The method according to claim 1, wherein said oil absorber is a granular powder having an average particle diameter of 0.2 to 5 mm.

9. A method for producing an absorbent, which comprises:

mixing and dispersing 50 to 95 parts by weight of (1) an oil-absorbent, cross-linked polymer formed from 96–99.999% by weight of (A) a monomer having a polymerizable unsaturated group in the molecule, said monomer (A) containing mainly a monomer having a solubility parameter of not more than 9, and 4–0.001% by weight of (B) a cross-linking monomer having at least two polymerizable unsaturated groups in the molecule, provided the sum of monomer (A) and cross-linking monomer (B) is 100%, with 50 to 5 parts by weight of (IV) at least one compound selected from the group consisting of a multivalent salt of a fatty acid of 6–30 carbon atoms, said multivalent metal salt having a dissolving degree of not more than 1 gram per 100 grams at 20° C. provided the sum of oil-absorbent, cross-linked polymer (I) and compound (IV) is 100 parts by weight in an aqueous medium; and then aggregating and granulating the resultant mixture to form a granular powder having an average particle diameter of 0.01–20 mm.

10. The method according to claim 9, wherein said monomer (A) mainly contains at least one unsaturated compound selected from the group consisting of an alkyl (meth) acrylate, an alkylaryl (meth)acrylate, an alkyl (meth) acrylamide, an alkylaryl (meth) acrylamide, a fatty acid vinyl ester, an alkyl styrene and an alpha-olefin, said compound having at least one fatty hydrocarbon group of 3–30 carbon atoms.

11. The method according to claim 9, wherein said cross-linking monomer (B) is selected from the group consisting of a (meth)acrylate and a divinylbenzene.

12. The method according to claim 9, wherein said oil-absorbent, cross-linked polymer (I) is a granular powder having an average particle diameter of 0.5 to 500 μm, and said compound (IV) is a powder having an average particle diameter of 0.01 to 300 μm.

13. The method according to claim 9, wherein the ratio of oil-absorbent, cross-linked polymer (I) to compound (IV) is 50–95 to 50–5 parts by weight.

14. The method according to claim 9, wherein said oil absorber is a granular powder having an average particle diameter of 0.2 to 5 mm.

* * * * *